United States Patent
Kobayashi

(10) Patent No.: US 10,140,686 B2
(45) Date of Patent: Nov. 27, 2018

(54) IMAGE PROCESSING APPARATUS, METHOD THEREFOR, AND IMAGE PROCESSING SYSTEM

(71) Applicant: CANON KABUSHIKI KAISHA, Tokyo (JP)

(72) Inventor: Tsuyoshi Kobayashi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 46 days.

(21) Appl. No.: 14/725,021

(22) Filed: May 29, 2015

(65) Prior Publication Data
US 2015/0363918 A1    Dec. 17, 2015

(30) Foreign Application Priority Data
Jun. 12, 2014  (JP) ................. 2014-121847

(51) Int. Cl.
G06T 5/00      (2006.01)
G06T 5/50      (2006.01)
H04N 5/367     (2011.01)

(52) U.S. Cl.
CPC .............. *G06T 5/002* (2013.01); *G06T 5/005* (2013.01); *G06T 5/50* (2013.01); *H04N 5/367* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 6,663,281 B2 | 12/2003 | Aufrichtig et al. | |
| 7,929,030 B2 * | 4/2011 | Sugizaki | H04N 5/367 348/241 |
| 8,792,024 B2 * | 7/2014 | Takenaka | A61B 6/00 348/246 |
| 9,025,055 B2 | 5/2015 | Kobayashi | H04N 5/361 |
| 2005/0220268 A1* | 10/2005 | Fujii | A61B 6/00 378/114 |
| 2008/0239115 A1* | 10/2008 | Sugizaki | H04N 5/32 348/246 |
| 2012/0020541 A1* | 1/2012 | Hayashida | A61B 6/583 382/132 |
| 2012/0044392 A1* | 2/2012 | Takenaka | A61B 6/00 348/246 |
| 2013/0223712 A1 | 8/2013 | Kobayashi | G06T 11/003 |
| 2014/0124678 A1* | 5/2014 | Yoneyama | A61B 6/4283 250/393 |

FOREIGN PATENT DOCUMENTS

| | | |
|---|---|---|
| JP | 2003-198937 A | 7/2003 |
| JP | A 2004-222143 | 8/2004 |
| JP | 2010-118780 A | 5/2010 |
| JP | 2011-087781 A | 5/2011 |
| JP | B 4819479 | 11/2011 |
| WO | 2011118286 A1 | 9/2011 |

* cited by examiner

*Primary Examiner* — Nancy Bitar
(74) *Attorney, Agent, or Firm* — Fitzpatrick Cella Harper and Scinto

(57) ABSTRACT

Information indicating at least one defective pixel in an imaging device for obtaining a radiographic image, based on characteristic information indicating an output fluctuation of each pixel caused by an accumulation state of an electric charge by a dark current in the imaging device. The radiographic image is corrected based on the information indicating the defective pixel.

17 Claims, 8 Drawing Sheets

FIG. 3A
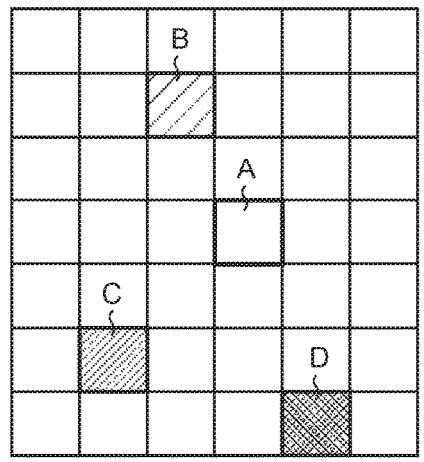
FIG. 3B
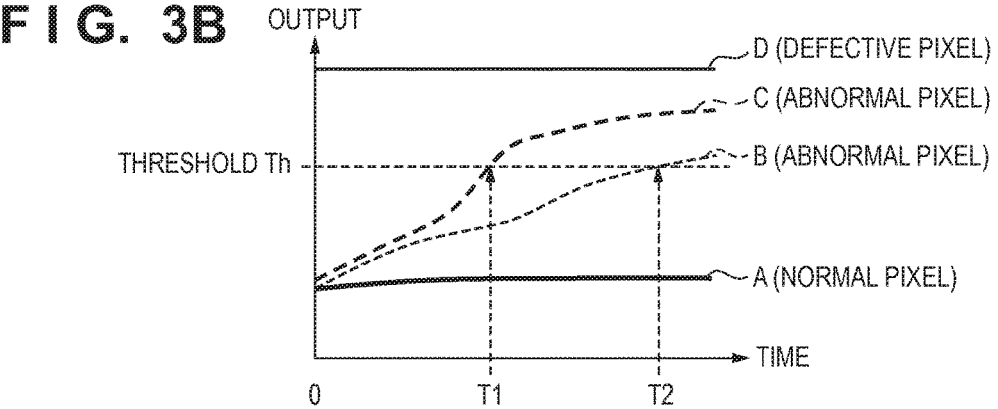
FIG. 3C
| 0 | 0 | 0 | 0 | 0 | 0 |
|---|---|---|---|---|---|
| 0 | 0 | 3 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 2 | 0 | 0 | 0 | 0 |
| 0 | 0 | 0 | 0 | 1 | 0 |

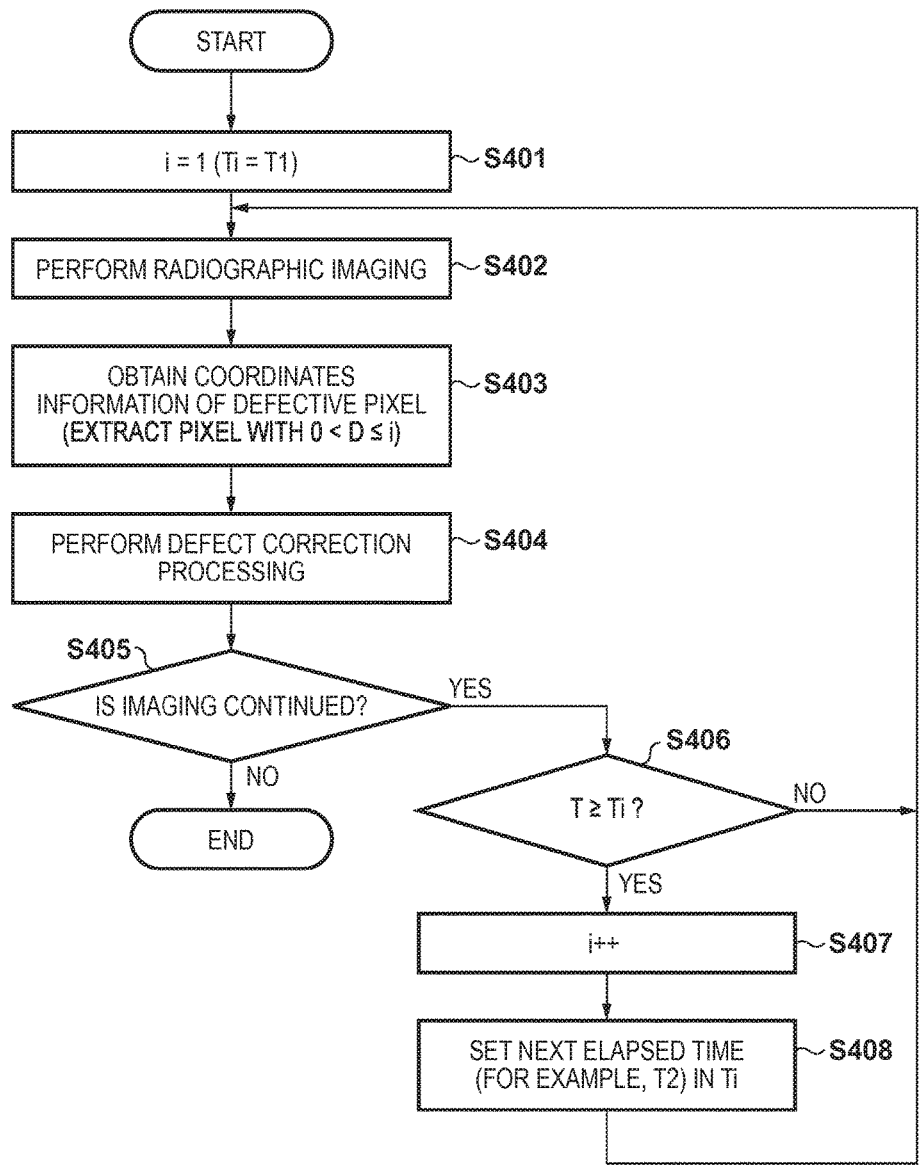

IMAGE PROCESSING APPARATUS, METHOD THEREFOR, AND IMAGE PROCESSING SYSTEM

BACKGROUND OF THE INVENTION

Field of the Invention

The present invention relates to image processing of correcting the influence of a defective pixel of an imaging device, which is included in an image.

Description of the Related Art

An imaging device formed by two-dimensionally arranging solid-state image sensors each made of amorphous silicon or single-crystal silicon has been prevalently put into practical use. Such imaging device is widely used not only for a digital camera which captures a visible light image but also for a medical apparatus which captures a radiographic image.

An image captured using the above-described imaging device generally includes a pixel influenced by fixed pattern noise caused by a dark current and a defective pixel caused by a small flaw specific to the image sensor. To create a more preferable image, it is necessary to remove the fixed pattern noise in the captured image and correct the influence of the defective pixel. As correction processing, there are known dark correction processing of removing fixed pattern noise by subtracting a dark image obtained by performing imaging in an unexposed state from an image captured in an exposed state, defect correction processing of interpolating the influence of a defective pixel from surrounding pixels, and the like.

As a technique of correcting the influence of a defective pixel in a captured image, it is common practice to detect in advance a defective pixel at the time of manufacturing an imaging device and store the address of the defective pixel in a memory. In the imaging device, however, it is known that a phenomenon occurs in which a pixel behaving like a defect changes depending on imaging conditions. Correcting, as a defective pixel, a pixel which is not defective increases the processing time and degrades the image quality. Displaying a defective pixel without correction fatally influences the image quality. Therefore, which pixel is selected as a defective pixel according to a situation and how to properly perform defect correction are important issues.

To cope with such situation, there has been proposed a technique of switching a defect correction method in accordance with specific imaging conditions. For example, Japanese Patent Laid-Open No. 2004-222143 (literature 1) proposes a method of switching a defect correction method in accordance with an imaging mode, shutter speed, sensitivity, and luminance at the time of imaging. Also, Japanese Patent No. 4819479 (literature 2) proposes a method of switching a defect correction method in accordance with the accumulation time and gain setting of an image sensor.

However, in a given type of imaging device, a phenomenon occurs in which a pixel behaving like a defect changes in accordance with the accumulation state of electric charges by a dark current generated in an image sensor. For example, a pixel does not exhibit a defect-like behavior when imaging is performed and dark correction is performed immediately after a dark image is obtained, and the same pixel may behave like a defective pixel when imaging is performed and dark correction is performed when a given time has elapsed after obtaining the dark image.

To perform appropriate defect correction for such imaging device, it is necessary to dynamically switch a defect correction method in accordance with the accumulation state of electric charges by a dark current. The techniques described in literatures 1 and 2 cannot solve the above problem since a defect correction method is switched in accordance with imaging conditions.

SUMMARY OF THE INVENTION

In one aspect, an image processing apparatus comprising: an obtaining unit configured to obtain information indicating at least one defective pixel in an imaging device for obtaining a radiographic image, based on characteristic information indicating an output fluctuation of each pixel caused by an accumulation state of an electric charge by a dark current in the imaging device; and a first correction unit configured to correct the radiographic image based on the information indicating the defective pixel.

According to the aspect, it is possible to appropriately correct the influence of a defective pixel included in an image captured using an imaging device in which a defective pixel changes depending on the accumulation state of an electric charge by a dark current.

Further features of the present invention will become apparent from the following description of exemplary embodiments with reference to the attached drawings.

BRIEF DESCRIPTION OF THE DRAWINGS

FIGS. 3A to 3C are views for explaining a defect map according to the first embodiment.

FIG. 4 is a flowchart illustrating details of the imaging processing according to the first embodiment.

DESCRIPTION OF THE EMBODIMENTS

Embodiments of the present invention will be described below with reference to the accompanying drawings. Note that the following embodiments are not intended to limit the scope of the appended claims, and that not all the combinations of features described in the embodiments are necessarily essential to the solving means of the present invention.

First Embodiment

[Apparatus Arrangement]

Figure 1:
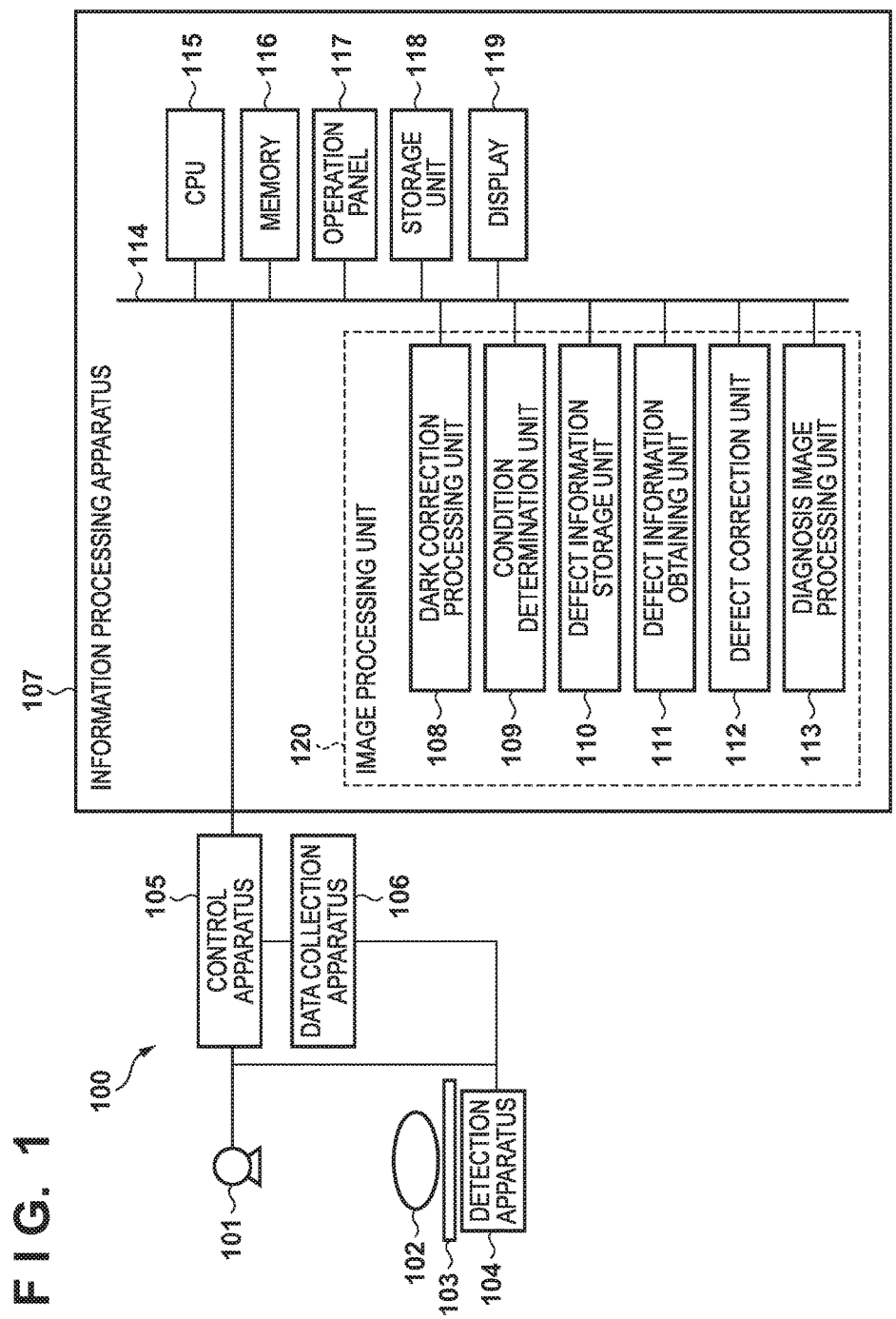
FIG. 1 is a block diagram showing the arrangement of a radiographic apparatus according to the first embodiment.

FIG. 1 is a block diagram showing a radiographic apparatus 100 used for imaging of a medical image as a preferred example of an embodiment including an image processing apparatus according to present invention.

The radiographic apparatus 100 includes a radiation generation apparatus 101, a bed 103 on which a subject 102 lies, and a detection apparatus 104 which outputs image data according to radiation having passed through the subject 102. The detection apparatus 104 is an imaging unit which includes an imaging device in which a plurality of image sensors (pixels) are two-dimensionally arranged, generates image data by detecting radiation for each image sensor (pixel), and outputs the generated image data. Furthermore, the radiographic apparatus 100 includes a control apparatus 105 which controls the radiation generation timing of the radiation generation apparatus 101 and the operation of the detection apparatus 104, a data collection apparatus 106 which collects various kinds of digital data, and an information processing apparatus 107 which controls image processing and the overall apparatus according to a user instruction.

The information processing apparatus 107 includes a microprocessor (CPU) 115, a memory 116, an operation panel 117, a storage unit 118, a display 119, and an image processing unit 120. These components are electrically connected through a bus 114. The memory 116 stores various kinds of data necessary for processing by the CPU 115, and also operates as a work memory for the CPU 115. The CPU 115 uses the memory 116 to control the overall operation of the apparatus and the like according to a user instruction input to the operation panel 117. The display 119 displays, as an image, collected digital data or a digital signal processed by the image processing unit 120. Note that the CPU 115 can also save an image to be displayed on the display 119 and the like in the storage unit 118, as needed.

The image processing unit 120 inputs an image obtained by the data collection apparatus 106, and performs dark correction processing and defect correction processing for the input image. The image processing unit 120 further performs sensitivity correction, noise reduction processing, and diagnosis image processing including adjustment and correction of a tone level, dynamic range, spatial frequency, and the like for the image having undergone the dark correction processing and defect correction processing, and outputs the resultant image. To do this, the image processing unit 120 includes a dark correction processing unit 108, a condition determination unit 109, a defect information storage unit 110, a defect information obtaining unit 111, a defect correction unit 112, and a diagnosis image processing unit 113.

Note that the image processing unit 120 may be formed by hardware, or implemented with software when the CPU 115 executes an image processing program stored in the storage unit 118. Furthermore, radiation according to the present invention is not limited to an X-ray generally used, and includes an alpha ray, beta ray, and gamma ray formed by particles (including photons) emitted due to radioactive decay as well as a ray having energy equal to or higher than those of the above rays, for example, a particle beam and cosmic ray. A case in which an X-ray is used as radiation will be explained below.

[Radiographic Imaging Processing]

Figure 2:
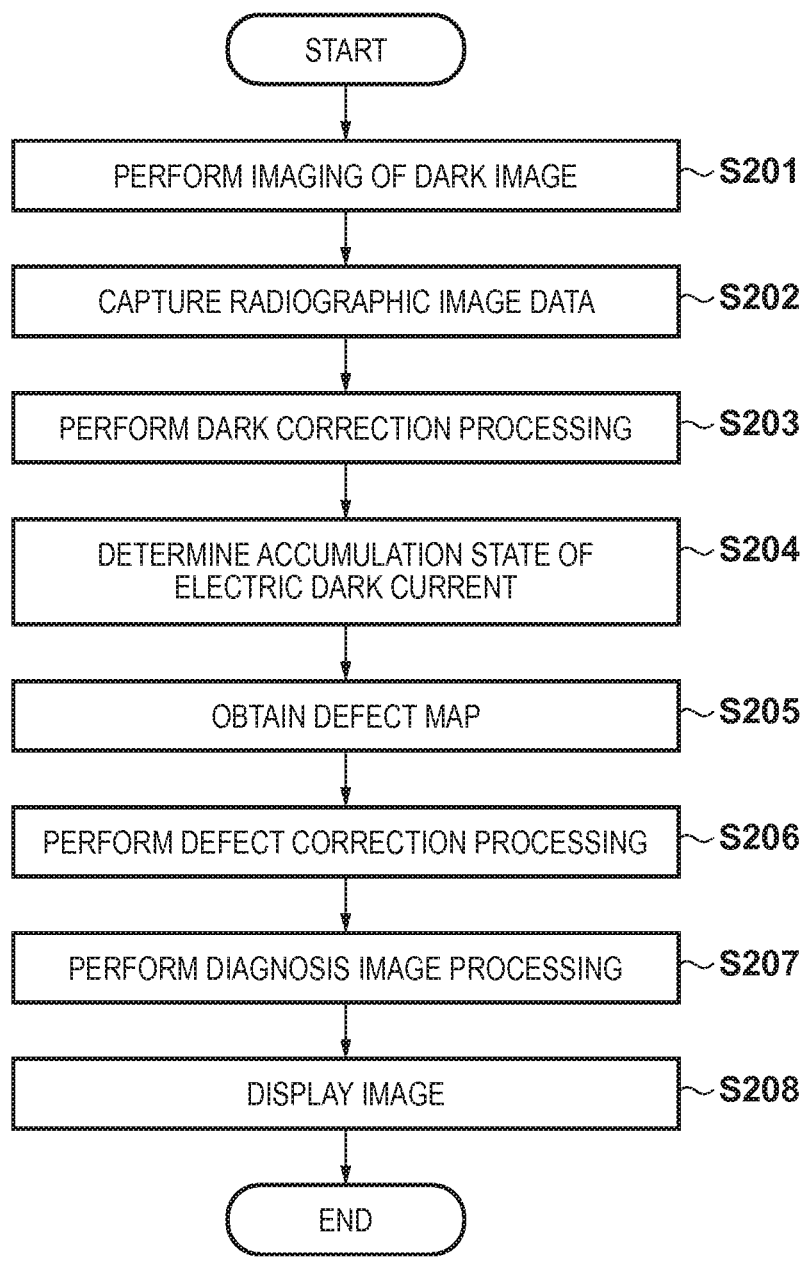
FIG. 2 is a flowchart illustrating an overview of imaging processing according to the first embodiment.

The schematic imaging operation of the radiographic apparatus 100 including the above components will be described with reference to a flowchart shown in FIG. 2.

First, imaging (to be referred to as "dark imaging" hereinafter) of a dark image as dark current data of an image sensor to be used in dark correction processing is performed (S201). That is, the detection apparatus 104 performs an operation of accumulating electric charges by a dark current in the unexposed state, and the data collection apparatus 106 collects a dark image including fixed pattern noise. The collected dark image is saved in the memory 116 through the bus 114. At this time, to reduce the influence of read noise contained in a dark image, dark imaging may be performed a plurality of times and an average image of the obtained dark images may be used as a dark image. When the accumulation time in imaging (to be referred to as "radiographic imaging" hereinafter) of the subject 102 is assumed not to be constant, it is preferable to perform imaging of a dark image for each of a plurality of accumulation times.

Next, radiographic imaging is performed (S202). That is, according to a user instruction, the control apparatus 105 performs irradiation with radiation from the radiation generation apparatus 101 and the accumulation operation of the imaging device of the detection apparatus 104 in synchronism with each other. The data collection apparatus 106 collects image data (to be referred to as "radiographic image data" hereinafter) of the subject 102, and inputs the data to the image processing unit 120. In other words, the detection apparatus 104 is an imaging unit which obtains a radiographic image using the imaging device.

Dark correction processing is performed to remove the fixed pattern noise contained in the radiographic image data (S203). In other words, the dark correction processing unit 108 subtracts the dark image obtained in step S201 from the radiographic image data. Note that it is preferable to select, for example, a dark image for an accumulation time closest to an accumulation time at the time of radiographic imaging so that the accumulation time of the imaging device at the time of dark imaging in step S201 is almost equal to that at the time of radiographic imaging in step S202. This can remove the fixed pattern noise with high accuracy.

The condition determination unit 109 determines the accumulation state, for example, the accumulation time of electric charges by a dark current in the imaging device when radiographic imaging is performed in step S202 (S204). To perform this determination processing, map information (to be referred to as a "defect map" hereinafter) for generating coordinates information of a defective pixel in the imaging device of the detection apparatus 104 is generated by measuring time-specific outputs of all pixels from a plurality of dark images obtained by performing dark imaging a plurality of times at predetermined time intervals before radiographic imaging. A defect map is generated at the time of, for example, inspection before shipping the detection apparatus 104, and the generated defect map is saved in the defect information storage unit 110.

The defect information obtaining unit 111 obtains coordinates information of a defective pixel based on the defect map stored in the defect information storage unit 110 and the accumulation state of electric charges by the dark current determined in step S204 (S205).

Based on the coordinates information of the defective pixel obtained by the defect information obtaining unit 111, the defect correction unit 112 performs defect correction processing for the-radiographic image data having undergone the dark correction processing in step S203 (S206). Note that the processes in steps S202 to S206 will be described in detail later. Note that before correction by the defect correction unit 112, the dark correction processing unit 108 performs dark correction on the radiographic image to remove noise contained in the radiographic image and caused by the dark current, based on the dark image obtained using the imaging device under the unexposed state.

The diagnosis image processing unit 113 performs the above-described diagnosis image processing for the radiographic image data which has undergone the defect correction processing and obtained in step S206 (S207). At this time, any well-known processing may be performed as the diagnosis image processing. The radiographic image data is processed into a medical image appropriate for diagnosis in the processing in step S207.

The image processing unit 120 displays, on the display 119 through the bus 114, the radiographic image data processed into the medical image (S208). According to a user instruction input from the operation panel 117, parameters of the diagnosis image processing are adjusted and the radiographic image data is saved in the storage unit 118, as needed.

Defect Map

The defect map saved in the defect information storage unit 110 will be described with reference to FIGS. 3A to 3C. FIG. 3A is a view showing a partial pixel region extracted in the imaging device of the detection apparatus 104. A case will be considered in which a pixel A (to be referred to as a "normal pixel" hereinafter) which does not exhibit an abnormal behavior even when a time has elapsed after the start of imaging, pixels B and C (to be referred to as "abnormal pixels" hereinafter) which exhibit abnormal behaviors with time, and a defective pixel D exist in the pixel region, as shown in FIG. 3A.

FIG. 3B is a timing chart showing output fluctuations of pixel outputs in a plurality of dark images captured in advance in time series in the radiographic apparatus 100. Referring to FIG. 3B, the ordinate represents the digital value of a pixel output of the imaging device, and the abscissa represents an elapsed time [sec] after the imaging device is applied with a bias voltage to be ready for imaging. The output of the pixel A remains almost constant with time. To the contrary, the output values of the pixels B and C change with time. The pixel D is a defective pixel which outputs an abnormal value regardless of the time.

Consider that dark correction is performed for the pixels B and C. Since outputs which should have fixed patterns, that is, constant values fluctuate, the fluctuation amounts remain even after correction. If the output fluctuation amount becomes too large, the pixel behaves to output an abnormal value independent of an X-ray signal derived from the subject 102. Therefore, if the output fluctuation exceeds an allowable threshold, it is desirable to perform correction by considering the pixel as a defective pixel. As shown in FIG. 3B, the threshold of the allowable output is represented by Th. At time T1, the output of the pixel C exceeds the threshold Th. At time T2, the output of the pixel B exceeds the threshold Th. After the output exceeds the threshold value Th, the pixel B or C is set as a defective pixel to perform processing. In other words, FIG. 3B shows characteristic information representing the relationship between a pixel and noise caused by accumulation of electric charges by a dark current in the imaging device of the detection apparatus 104.

FIG. 3C shows an example of the defect map according to the first embodiment. Let D(x, y) be the value of a cell at coordinates (x, y). Then, D=0 is stored at an address representing the coordinates of the normal pixel A, and D=1 is stored at an address representing the coordinates of the defective pixel D which outputs an abnormal value regardless of the time. Furthermore, D=2 is stored at an address representing the coordinates of the abnormal pixel C whose output exceeds the threshold Th after time T1, and D=3 is stored at an address representing the coordinates of the abnormal pixel B whose output exceeds the threshold Th after time T2.

As described above, the defect map generated based on the plurality of dark images obtained in time series by using the imaging device under the unexposed state is characteristic information indicating an output fluctuation of each pixel caused by the accumulation state of electric charges by a dark current in the imaging device. Therefore, it is possible to obtain information indicating at least one defective pixel in the imaging device based on the defect map. Note that information indicating a defective pixel represents the location of the defective pixel in the imaging device.

The defect map as characteristic information is generated based on the relationship (FIG. 3B) between the time and an output fluctuation of each pixel of the imaging device. More specifically, the defect map as characteristic information is generated based on the relationship (FIG. 3B) between an output fluctuation of each pixel of the imaging device and the elapsed time after the imaging device is ready for imaging. Therefore, the defect map as characteristic information comprises map information that indicates the time at which the output fluctuation of each pixel of the imaging device exceeds a predetermined value after the imaging device is ready for imaging.

Note that the threshold Th is set so that the fluctuation amount remaining after dark correction falls within a range without any problem in use. The range without any problem in use is desirably decided in advance by performing subjective evaluation and the like. The progress determination times T1 and T2 may be arbitrarily decided in consideration of the increased number of defective pixels with time after the start of the operation of the detection apparatus 104. For example, it is preferable to decide the progress determination times T1 and T2 so that the increased number of defective pixels during a period from 0 to T1 is equal to that during a period from T1 to T2. In addition, although a case in which the time is divided by T1 and T2 has been explained, the present invention is not limited to this and the time may be further divided by T3, T4, . . . to generate a defect map.

It is generally known that a dark image fluctuates with the temperature. It is, therefore, desirable to obtain a defect map for each temperature assumed in practical use. In this case, the condition determination unit 109 selects a defect map with a condition close to the temperature of the imaging device at the time of an imaging operation, and performs processing of determining the charge accumulation state. In other words, a plurality of defect maps (a plurality of characteristic information) are generated in accordance with the temperatures of the imaging device, and the defect information obtaining unit 111 obtains information indicating a defective pixel using one of the plurality of defect maps (the plurality of characteristic information) corresponding to the temperature of the imaging device when obtaining the radiographic image.

Radiographic Imaging Processing (S202 to S206)

The radiographic imaging processing will be explained with reference to a flowchart shown in FIG. 4. The processing shown in FIG. 4 corresponds to the processes in steps S202 to S206 of FIG. 2.

When the condition determination unit 109 sets an initial value "1" in a counter variable i, for example, the progress determination time T1 shown in FIG. 3B is set as an initial determination time Ti (S401), and radiographic imaging by the radiographic apparatus 100 starts (S402). Note that in step S402, the detection apparatus 104 performs radiographic imaging (S202) and the dark correction processing unit 108 performs dark correction processing (S203).

The defect information obtaining unit 111 obtains, from the defect map, coordinates information of a defective pixel to be referred to by the defect correction unit 112 (S403). The defect information obtaining unit 111 extracts coordinates information of a pixel with 0<D≤i from the defect map saved in the defect information storage unit 110 based on the counter variable i designated by the condition determination unit 109 (S204), and sets the extracted coordinates information as the latest coordinates information of the defective pixel (S205). In other words, based on a characteristic map as characteristic information, the defect information obtaining unit 111 determines, as a defective pixel, a pixel of the imaging device, whose output exceeds the predetermined value at the elapsed time after the imaging device is ready for imaging when imaging the radiographic image, and obtains information of that pixel.

The defect correction unit 112 performs defect correction processing (S206) using the coordinates information of the defective pixel obtained by the defect information obtaining unit 111 (S404). There have been conventionally proposed many methods as defect correction processing, and any well-known method may be used. For example, a method of performing interpolation from peripheral pixels can be applied as defect correction processing, as given by:

$$S'(x, y) = \frac{1}{P_{norm}} \cdot \sum_{m=-k}^{k} \sum_{n=-k}^{k} S(x+m, y+n) w(x+m, y+n) \quad (1)$$

$$\text{where } P_{norm} = \sum_{m=-k}^{k} \sum_{n=-k}^{k} w(x+m, y+n)$$

In equation (1), S(x, y) represents a pixel value at the coordinates (x, y) and S'(x, y) represents a pixel value after defect correction. Furthermore, w(x, y) represents a value indicating whether the pixel at the coordinates (x, y) is a defective pixel. A defective pixel is indicated by w=0 and a normal pixel is indicated by w=1. In addition, $P_{norm}$ represents the total number of normal pixels. According to equation (1) above, if the peripheral pixels include a defective pixel, defect correction is performed without using information of the defective pixel.

In accordance with a user operation, the process branches depending on whether to continue radiographic imaging (S405). If radiographic imaging is not continued, the process ends; otherwise, the process transits to step S406.

In step S406, the condition determination unit 109 determines whether an elapsed time T after the power is turned on and the detection apparatus 104 is ready for imaging exceeds the determination time Ti at the time of next radiographic imaging processing in step S402. If T<Ti, the process directly returns to step S402 to perform radiographic imaging. On the other hand, if T≥Ti, the condition determination unit 109 adds 1 to the counter variable i (S407), and sets the next progress determination time (for example, T2) in the determination time Ti (S408). After that, the process returns to step S402 to perform next radiographic imaging.

Note that a case in which the location (coordinates) of a defective pixel is detected with reference to the defect map prepared in advance has been explained. However, it is not always necessary to store the defect map. In other words, based on the output fluctuation characteristics of pixel outputs shown in FIG. 3B, it is only necessary to detect, as a defective pixel, a pixel whose output exceeds the threshold Th at the progress time T, and specify the location of the pixel.

As described above, it is possible to dynamically change a defective pixel in accordance with the accumulation state of electric charges by a dark current. Consequently, it is possible to perform appropriate defect correction processing even for a radiographic image represented by radiographic image data obtained using the imaging device in which a defective pixel changes.

Modification of Embodiment

A case in which defect correction processing is performed for radiographic image data in the image processing unit 120 provided in the information processing apparatus 107 has been explained above. However, this defect correction processing can be executed on the side of the detection apparatus 104.

Figure 9:
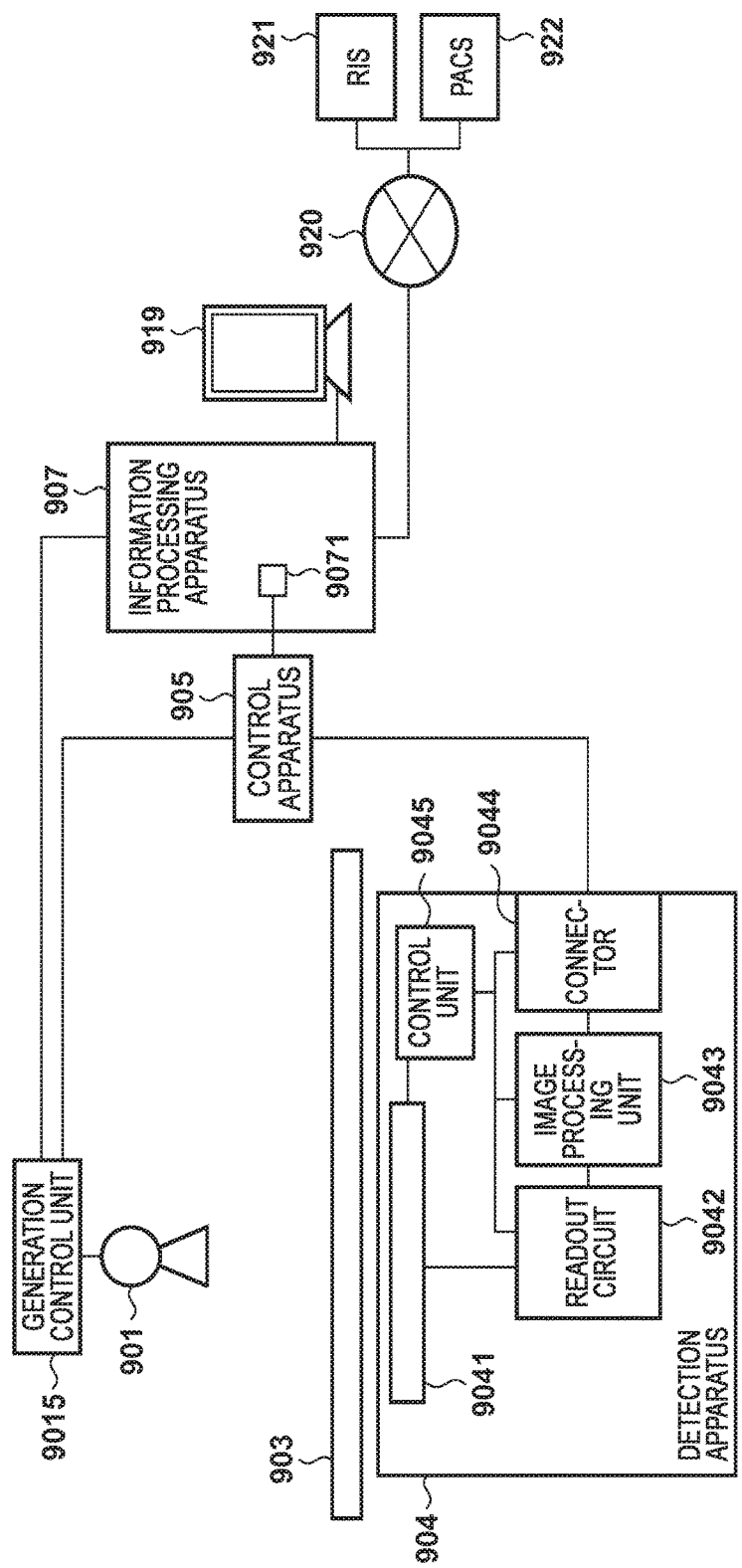
FIG. 9 is a block diagram showing the arrangement of a radiographic imaging system according to a modification of the first embodiment.

A radiographic imaging system of capturing a medical image managed especially in a hospital will be exemplified as an image processing system in which defect correction processing is performed on the side of the detection apparatus 104. FIG. 9 is a block diagram showing the arrangement of the radiographic imaging system. Referring to FIG. 9, reference numerals 901, 903, 904, 905, and 907 denote the same components as those denoted by reference numerals 101, 103, 104, 105, and 107 in FIG. 1, respectively, and a detailed description thereof will be omitted.

The detection apparatus 904 shown in FIG. 9 includes an X-ray sensor 9041 as an imaging device, a readout circuit 9042, an image processing unit 9043, a connector 9044, and a control unit 9045. The X-ray sensor 9041 includes a sensor array formed by two-dimensionally arranging solid-state image sensors each made of amorphous silicon or single-crystal silicon, on which a phosphor for converting X-rays into visible light is stacked. This makes it possible to obtain an X-ray image by converting the received X-rays into an electric signal. Note that the X-ray sensor 9041 may be a sensor which directly converts X-rays into an electric signal by an image sensor made of amorphous selenium. A driving circuit controls accumulation and readout of electric charges of the sensor array of the X-ray sensor 9041.

The readout circuit 9042 includes an amplifier for amplifying an electric signal output from the X-ray sensor 9041, and an analog-to-digital converter for converting an amplified signal into, for example, a 16-bit digital value. The image processing unit 9043 has the same function as that of the image processing unit 120 provided in the information processing apparatus 107 shown in FIG. 1. That is, the image processing unit 9043 performs, for radiographic image data, defect correction processing of dynamically switching a defective pixel according to the accumulation state of electric charges (a dark current signal) by a dark current, and outputs the radiographic image data processed into a medical image appropriate for diagnosis.

The connector 9044 transmits the image data output from the image processing unit 9043 to the control apparatus 905. An optical fiber or wired or wireless local area network is used for a transmission path. The control unit 9045 is a control circuit for controlling the timings of the operation of the X-ray sensor 9041, driving of the readout circuit 9042, processing of the image processing unit 9043, and transfer of image data through the connector 9044, all of which are performed along with imaging. The X-ray sensor 9041 serving as an imaging device is controlled by the control unit 9045 that controls reading of the dark current signal of the imaging device to repeatedly update dark current data used in dark correction of the radiographic image. Note that the control unit 9045 and the image processing unit 9043 may be implemented as a single FPGA (Field-Programmable Gate Array).

The control apparatus 905 transmits an X-ray irradiation instruction to a generation control unit 9015 in accordance with a user imaging request. In synchronism with an X-ray irradiation timing, the detection apparatus 904 transmits a control instruction to perform an imaging operation to the control unit 9045 of the X-ray sensor 9041.

A capture board 9071 of the information processing apparatus 907 is an interface for transferring, to the information processing apparatus 907, an image signal transmitted from the control apparatus 905, and uses, for example, Camera Link® as a transmission method.

A display 919 is connected to the information processing apparatus 907, and the image processing unit 9043 of the detection apparatus 904 displays radiographic image data processed into a medical image. The radiographic image data sent to the information processing apparatus 907 is stored in, for example, the storage unit 118, and then provided to a radiology information system (RIS) 921, a picture archiving and communication system (PACS) 922, and the like through an intra-hospital local area network 920.

As described above, the radiographic imaging system includes an image processing system in which a defective pixel in the imaging device for obtaining a radiographic image is determined based on a defect map (characteristic information) indicating an output fluctuation of each pixel caused by the accumulation state of electric charges by a dark current in the imaging device, and a radiographic image is corrected based on the determination result. Therefore, with an arrangement in which defect correction processing is performed on the side of the detection apparatus 904, it is also possible to obtain the same result as that in the first embodiment.

Second Embodiment

The second embodiment of the present invention will be described below. Note that the arrangement of a radiographic apparatus according to the second embodiment is the same as that shown in FIG. 1 of the first embodiment and a description thereof will be omitted. A detailed description of the same processing as that in the first embodiment will also be omitted in the second embodiment. Only the difference from the first embodiment will be explained.

In a radiographic apparatus 100 according to the second embodiment, the arrangement of a defect map, and the operations of a condition determination unit 109 and defect information obtaining unit 111 for determining the accumulation state of electric charges by a dark current at the time of radiographic imaging are different from those in the first embodiment.

Defect Map

Figures 5, 6:
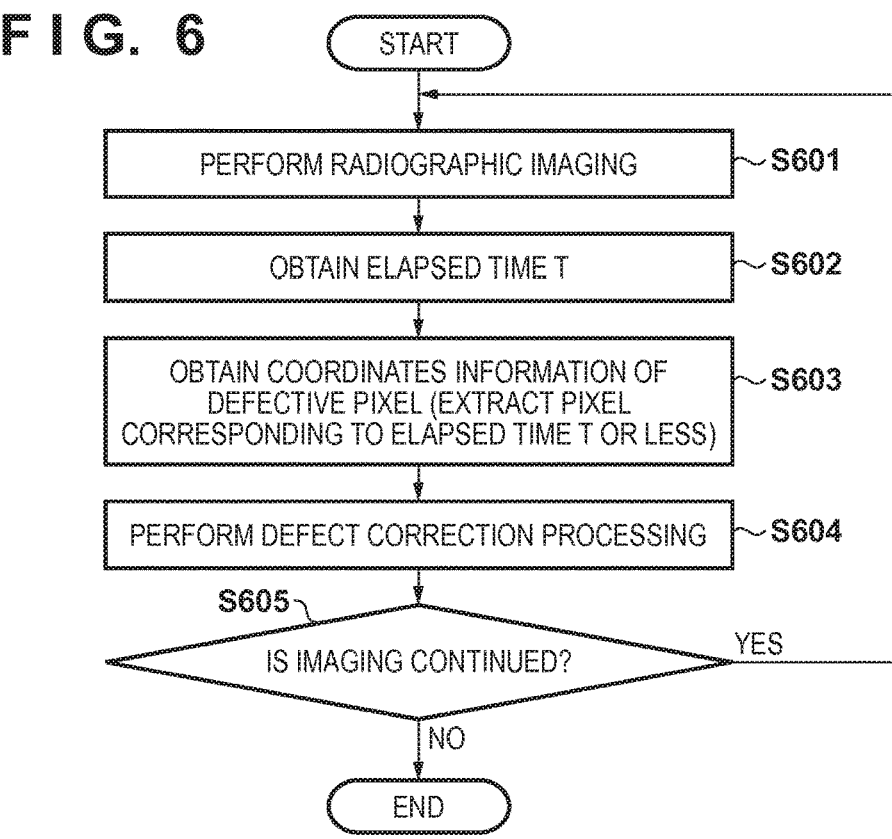
FIG. 5 is a view for explaining a defect map according to the second embodiment.
FIG. 6 is a flowchart illustrating imaging processing according to the second embodiment.

FIG. 5 shows an example of a defect map saved in a defect information storage unit 110 according to the second embodiment. FIG. 5 shows an example of a defect map in which each cell is formed by a 2-byte unsigned integer. Let D(x, y) be the value of a cell at coordinates (x, y). Then, a maximum value Tmax (for example, D=65,535 (0xFFFF)) is stored at an address representing the coordinates of a normal pixel A shown in FIG. 3A, and D=0 (0x0000) is stored at an address representing the coordinates of a defective pixel D shown in FIG. 3A. Furthermore, D=T1 is stored at an address representing the coordinates of an abnormal pixel C whose output exceeds a threshold Th after time T1, and D=T2 is stored at an address representing the coordinates of an abnormal pixel B whose output exceeds the threshold Th after time T2. With this processing, a time (to be referred to as a "defect determination time" hereinafter) until a corresponding pixel is determined as a defective pixel is stored in each cell of the defect map shown in FIG. 5.

A pixel, like the normal pixel A, which does not become a defective pixel even after a time elapses is prevented from being extracted as a defective pixel by storing the maximum value of 65,535 (0xFFFF) of the 2-byte unsigned integer as a reservation value Tmax in a corresponding cell. For example, assuming that the unit of the value of the cell is "sec", the possible longest defect determination time of the defect map corresponds to 65,534 sec (except for the reservation value of 65,535 used by the normal pixel), that is, about 18 hours, and the time which imposes no problem in terms of the use of the radiographic apparatus 100 is generally ensured. Note that the unit of the value of the cell of the defect map is not limited to the above example. It may be possible to deal with a longer time by making the time unit smaller (for example, ½ sec or ¹⁄₁₀ sec) to increase the time resolution or by increasing the settable maximum value (for example, 4 bytes). To the contrary, the necessary memory capacity may be saved by decreasing the value settable in the cell of the defect map to make the time unit larger.

The thus generated defect map is saved in advance in the defect information storage unit 110.

Radiographic Imaging Processing (S202 to S206)

Radiographic imaging processing according to the second embodiment will be described with reference to a flowchart shown in FIG. 6. The processing shown in FIG. 6 is processing executed by the condition determination unit 109 and defect information obtaining unit 111, similarly to the processing shown in FIG. 4 of the first embodiment, and corresponds to the processes in steps S202 to S206 of FIG. 2.

When the radiographic apparatus 100 starts radiographic imaging (and dark correction processing) (S601), the condition determination unit 109 obtains an elapsed time T after the power is turned on and a detection apparatus 104 is ready for imaging (S602).

The defect information obtaining unit 111 obtains, from the defect map, coordinates information of a defective pixel to be referred to by a defect correction unit 112 (S603). That is, the defect information obtaining unit 111 extracts, from the defect map saved in the defect information storage unit 110, coordinates information of a pixel having a cell value equal to or smaller than the elapsed time T obtained by the condition determination unit 109, and sets the extracted coordinates information as the latest coordinates information of the defective pixel.

The defect correction unit 112 performs defect correction processing using the coordinates information of the defective pixel obtained by the defect information obtaining unit 111, similarly to the first embodiment (S604).

In accordance with a user operation, the process branches depending on whether to continue radiographic imaging (S605). If radiographic imaging is not continued, the process ends; otherwise, the process returns to step S601.

As described above, a defective pixel can be dynamically changed at a shorter time interval. Consequently, it is possible to perform dynamic defect correction processing according to the accumulation state of electric charges by a dark current with higher precision.

Third Embodiment

The third embodiment of the present invention will be described below. Note that the arrangement of a radiographic apparatus according to the third embodiment is the same as that shown in FIG. 1 of the first embodiment and a description thereof will be omitted. In the third embodiment, it is determined whether to update a dark image during radiographic imaging in addition to the above-described radiographic imaging processing of the second embodiment, and a defect map is selectively used based on the update time of the dark image.

Radiographic Imaging Processing

Figure 7:
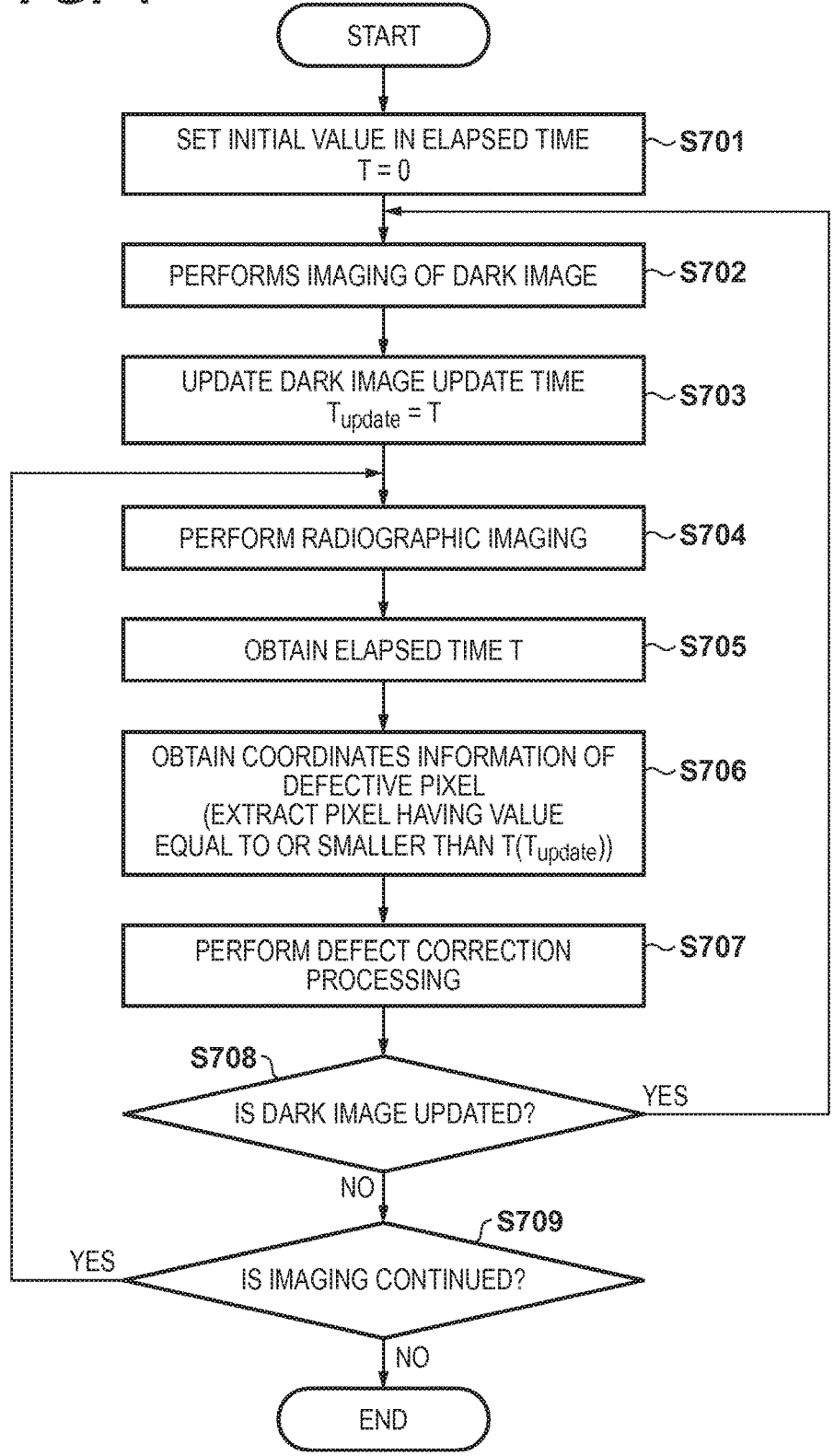
FIG. 7 is a flowchart illustrating imaging processing according to the third embodiment.

Radiographic imaging processing according to the third embodiment will be described below with reference to a flowchart shown in FIG. 7.

When the power is turned on and a detection apparatus 104 is ready for imaging, a condition determination unit 109 sets an initial value "0" in an elapsed time T after the imaging device of the detection apparatus 104 is applied with a bias voltage to be ready for imaging (S701).

After the detection apparatus 104 performs imaging of a dark image (S702), the condition determination unit 109 substitutes the elapsed time T into Tupdate representing the time at which the dark image is obtained (S703). The time Tupdate at which the dark image is obtained will be referred to as a "dark image update time" hereinafter.

After the detection apparatus 104 performs radiographic imaging and dark correction using the dark image captured in step S702 (S704), the condition determination unit 109 obtains the elapsed time T after imaging of the dark image (S702) from a timer (not shown) in the apparatus (S705).

A defect information obtaining unit 111 obtains coordinates information of a defective pixel to be referred to by a defect correction unit 112 from a defect map saved in advance in a defect information storage unit 110 (S706). The defect map according to the third embodiment is generated according to the dark image update time Tupdate. In step S706, the latest coordinates information of the defective pixel according to the elapsed time T is extracted from the defect map corresponding to the dark image update time Tupdate. Details of the defect map according to the third embodiment will be described later.

The defect correction unit 112 performs defect correction using the coordinates information of the defective pixel obtained by the defect information obtaining unit 111, similarly to the first embodiment (S707).

The condition determination unit 109 determines whether to update the dark image (S708). Conditions for the determination processing are decided according to various cases. The dark image may be updated when, for example, the number of defective pixels exceeds a predetermined number. Furthermore, the dark image may be updated when the temperature of the imaging environment largely changes to change fixed pattern noise, or the dark image may be updated for the purpose of improving the image quality at an arbitrary timing at which imaging stops. If it is determined not to update the dark image, the process advances to step S709; otherwise, the process returns to step S702 to perform imaging of a dark image (S702) and update the dark image update time Tupdate (S703).

In accordance with a user operation, the process branches depending on whether to continue radiographic imaging (S709). If radiographic imaging is not continued, the process ends; otherwise, the process returns to step S704 to perform radiographic imaging.

Defect Map

Figure 8A:
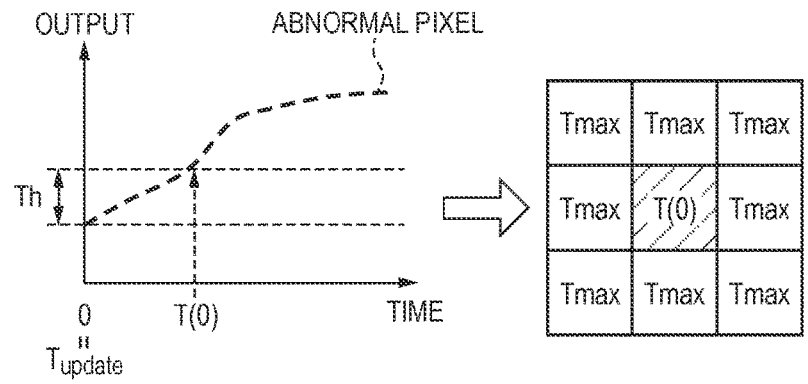
FIGS. 8A to 8C are views for explaining a defect map according to the third embodiment.
Figure 8B:
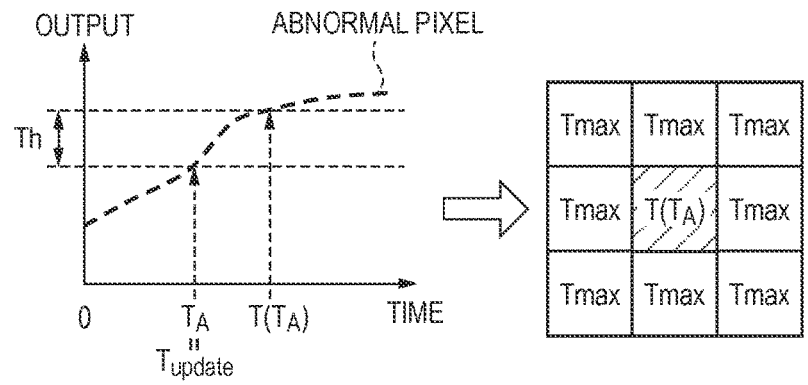
Figure 8C:
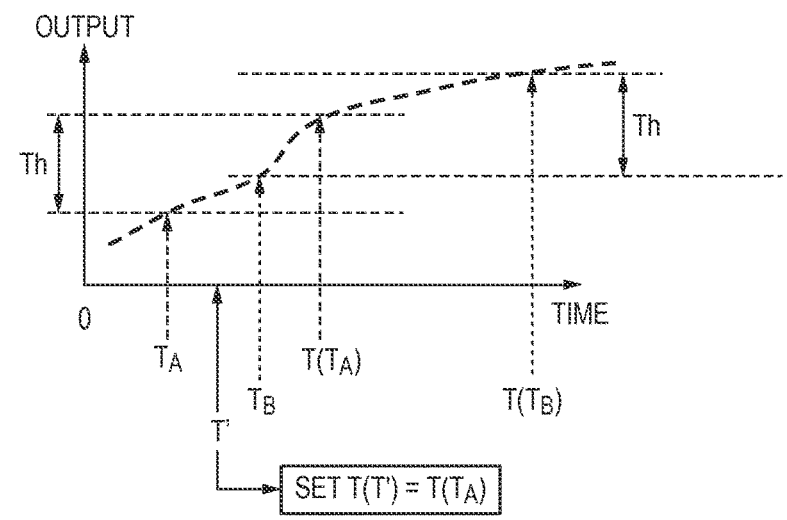

A defect map creation method according to the third embodiment will be described below with reference to FIGS. 8A to 8C. FIGS. 8A to 8C are views each showing a fluctuation of a pixel output value and an example of a defect map according to the fluctuation. Each of FIGS. 8A to 8C especially exemplifies the behavior of an abnormal pixel, in which the ordinate represents the digital value of a pixel output of the imaging device, and the abscissa represents the time after the imaging device is applied with a bias voltage to be ready for imaging.

A defect map used in the third embodiment has values according to the timing (dark image update time Tupdate) at which the dark image to be used in dark correction is updated. In other words, each cell of the defect map has a value T(Tupdate) according to the dark image update time Tupdate.

FIG. 8A shows an example of the defect map when the dark image is in an initial state. In this example, assume that the dark image is obtained immediately after the start of imaging (S701), and the dark image update time Tupdate is set to "0". In this case, Tupdate=0 is set as a starting point and a time T(0) until the value of a pixel output exceeds a predetermined threshold Th is stored in a corresponding cell of the defect map. That is, the time T(0) is a defect determination time from when the dark image is obtained until the pixel is determined to be defective.

FIG. 8B shows an example of the defect map when the dark image is updated at elapsed time $T_A$. In this case, Tupdate=$T_A$ is set as a starting point, and a time $T(T_A)$ until the value of the pixel output exceeds the predetermined threshold Th is stored in the corresponding cell of the defect map. That is, the time $T(T_A)$ is a defect determination time from when the dark image is updated until the pixel is determined to be defective.

As described above, a defect determination time is set for each dark image update time Tupdate in the defect map according to the third embodiment. Therefore, a plurality of maps corresponding to the dark image update times Tupdate are generated as defect maps according to the third embodiment. Note that the form of the defect map is not limited as long as it is possible to refer to the location (coordinates) of an abnormal pixel and the amount of an output fluctuation of the pixel according to the timing.

In step S706, the defect information obtaining unit 111 extracts coordinates information of a pixel having a cell value equal to or smaller than the elapsed time T obtained in step S705 with reference to a defect map corresponding the nearest dark image update time Tupdate, and sets the extracted coordinates information as the latest coordinates information of the defective pixel.

As described above, the defect map as characteristic information is generated based on the relationship (FIGS. 8A to 8C) between an output fluctuation of each pixel of the imaging device and an elapsed time after imaging of a dark image. The defect information storage unit 110 is a memory for storing a plurality of defect maps (a plurality of characteristic information) corresponding to each time at which a dark images is to be obtained after the imaging device is ready for imaging. The condition determination unit 109 determines the time at which the dark image is obtained after the imaging device is ready for imaging so that the defect information obtaining unit 111 selects one of the plurality of defect maps (the plurality of characteristic information) based on the determined time. Based on the selected defect map (selected characteristic information), the defect information obtaining unit 111 determines, as a defective pixel, a pixel whose output for the elapsed time exceeds the predetermined value, thereby obtaining information of that pixel.

Limiting of Defect Map

To make the defect map correspond to an arbitrary dark image update time Tupdate, it is necessary to prepare defect determination times T(Tupdate) at a number of timings for all the pixels of a captured image obtained by the detection apparatus 104. If the memory capacity of the defect information storage unit 110 is limited, the dark image update times Tupdate are limited to some (preferably, several) predetermined timings to decrease the data amount of the defect determination times T(Tupdate).

FIG. 8C shows a case in which the dark image update times Tupdate held in the defect map are limited to predetermined timings $T_A$ and $T_B$. If dark image update processing is performed at dark image update time Tupdate=T' ($T_A$<T'<$T_B$), T($T_A$) is applied as a defect determination time T(T') until the value of the pixel output exceeds the predetermined threshold Th. With this operation, the time T($T_A$) shorter than the original defect determination time T(T') for the dark image update time Tupdate=T' is substituted for a value of the defect map. If the dark image update time Tupdate=T' (TB<T'), the time T(TB) shorter than the original defect determination time T(T') is substituted for a value of the defect map by applying T(TB) as the defect determination time T(T').

It is, therefore, possible to perform defect correction processing by significantly decreasing the data amount of the defect map without missing coordinates which should be originally determined as a defective pixel in the defect map.

As described above, even if the dark image is updated at an arbitrary timing, it is possible to appropriately perform dynamic defect correction processing according to the accumulation state of electric charges by a dark current.

Modification of Third Embodiment

In the third embodiment, a case in which the defect map is selectively used depending on the elapsed time has been explained. The present invention, however, is not limited to the elapsed time, and the defect map can be selectively used according to "the progress of the imaging state". For example, assume that the number of captured frames indicates the progress of the imaging state. In this case, if N frames of a radiographic image are captured after the dark image is updated, it is controlled to selectively use another defect map from the (N+1)th frame. In other words, it is possible to selectively obtain a defect map to be applied to the defect correction processing of a radiographic image captured during a period from when a dark image is captured or updated for the first time (the first event) until the dark image is updated next (the second event), based on the progress of the imaging state from the first event to imaging of the radiographic image.

In other words, the defect information storage unit 110 is a memory that stores a plurality of defect maps (a plurality of characteristic information) corresponding to the progress of the imaging state after updating dark current data. In order to select characteristic information to be applied to correction, which is performed by the defect correction unit 112, of a radiographic image captured during a period from the first event of reading the dark current signal of the imaging device to the second event of reading the next dark current signal, the condition determination unit 109 determines the progress of the imaging state from the first event to imaging of the radiographic image. The defect information obtaining unit 111 obtains information indicating a defective pixel using a defect map (characteristic information) selected from the plurality of defect maps (the plurality of characteristic information) based on the determined progress.

When processing an X-ray image obtained by an X-ray sensor 9041 whose a dark current signal is repeatedly read out to repeatedly update dark current data used in dark correction of a captured image, an image processing unit 9043 obtains a defect map to be applied to the correction processing of a defective pixel in an image captured during a period from the first event of reading the dark current signal of the X-ray sensor to the second event of reading the next dark current signal, based on the progress of the imaging state from the first event to imaging of the image, thereby performing the correction processing of a defective pixel on the captured image based on the obtained defect map.

As described above, the progress of the imaging state includes not only the elapsed time but also the number of frames when continuing imaging. Therefore, the condition determination unit 109 determines the progress of the imaging state from the first event to imaging of a radiographic image, and the defect information obtaining unit 111 selectively obtains a defect map to be applied to the defect correction processing of the radiographic image based on the determination result.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-121847 filed Jun. 12, 2014 which is hereby incorporated by reference herein in its entirety.

What is claimed is:

1. An image processing apparatus comprising:
   an imaging device configured to obtain a radiographic image according to radiation; and
   at least one processor operatively coupled to a memory device and programmed to provide:

a defect information storage unit configured to store a first defective pixel that outputs an abnormal value regardless of time to a defect map;

a defect information obtaining unit configured to obtain, based on characteristic information indicating a relationship between an output fluctuation amount of a pixel of the imaging device and an elapsed time after the imaging device is ready for imaging, a second defective pixel in which the output fluctuation amount under an unexposed state exceeds a predetermined threshold, wherein the defect information storage unit stores the second defective pixel to the defect map; and a defect correction unit configured to correct defects of the radiographic image based on the defect map that includes the first defective pixel and the second defective pixel.

2. The apparatus according to claim 1, wherein the at least one processor is further programmed to provide a dark correction unit configured to perform, before the correction by the defect correction unit, a dark correction on the radiographic image to remove noise contained in the radiographic image and caused by the dark current, based on a dark image obtained using the imaging device under an unexposed state.

3. The apparatus according to claim 2, wherein the characteristic information indicates a relationship between the output fluctuation amount of a pixel of the imaging device and an elapsed time after imaging the dark image.

4. The apparatus according to claim 3, further comprising a memory configured to store a plurality of characteristic information corresponding to each time at which the dark image is to be obtained after the imaging device is ready for imaging.

5. The apparatus according to claim 4, wherein the at least one processor is further programmed to provide a determination unit configured to determine a time at which the dark image is obtained after the imaging device is ready for imaging so that the defect information obtaining unit selects one of the plurality of characteristic information based on the determined time.

6. The apparatus according to claim 1, wherein the characteristic information is generated based on a plurality of dark images obtained in time series using the imaging device under an unexposed state.

7. The apparatus according to claim 6, wherein the characteristic information comprises map information that indicates a time at which the output fluctuation of a pixel of the imaging device exceeds a predetermined value after the imaging device is ready for imaging.

8. The apparatus according to claim 6, wherein a plurality of characteristic information are generated in accordance with temperatures of the imaging device, and the defect information obtaining unit obtains the second defective pixel using one of the plurality of characteristic information, corresponding to a temperature of the imaging device when obtaining the radiographic image.

9. The apparatus according to claim 1, wherein the defective map represents a location of the first and second defective pixels in the imaging device.

10. The apparatus according to claim 1, wherein the imaging device is controlled by a control circuit that controls reading of a dark current signal of the imaging device to repeatedly update dark current data used in a dark correction of the radiographic image, and the apparatus further comprising a memory configured to store a plurality of characteristic information corresponding to progress of an imaging state after updating the dark current data, wherein the at least one processor is further programmed to provide:

a dark correction unit configured to perform, before the correction by the defect correction unit, a dark correction on the radiographic image based on the dark current data; and a determination unit configured to determine, in order to select characteristic information to be applied to the correction, which is performed by the defect correction unit, of the radiographic image captured during a period from a first event of reading the dark current signal of the imaging device to a second event of reading the next dark current signal, the progress of the imaging state from the first event to imaging of the radiographic image, and wherein the defect information obtaining unit obtains the information indicating the second defective pixel using characteristic information selected from the plurality of characteristic information based on the determined progress.

11. An image processing method comprising:

using a processor to perform steps of:

storing a first defective pixel that outputs an abnormal value regardless of time to a defect map;

obtaining, based on characteristic information indicating a relationship between an output fluctuation amount of a pixel of the imaging device and an elapsed time after the imaging device is ready for imaging, a second defective pixel in which the output fluctuation amount exceeds a predetermined threshold under an unexposed state, wherein the second defective pixel is stored in the defect map; and correcting defects of the radiographic image based on-the defect map that includes the first defective pixel and the second defective pixel.

12. A non-transitory computer readable medium storing a computer-executable program for causing a computer to perform an image processing method according to claim 11.

13. The image processing apparatus according to claim 1, wherein the defect map always indicates a certain pixel as the second defective pixel after a fluctuation amount of the certain pixel exceeds the threshold value under an unexposed state.

14. An image processing apparatus comprising:

an imaging device configured to obtain a radiographic image according to radiation; and at least one processor operatively coupled to a memory device and programmed to provide:

a defect information obtaining unit configured to obtain, based on characteristic information indicating a relationship between an output fluctuation amount of a pixel of the imaging device under an unexposed state and an elapsed time after the imaging device is ready for imaging or after imaging the dark image, a defective pixel in which the output fluctuation amount exceeds a predetermined threshold at the elapsed time;

a defect information storage unit configured to store a defect map that includes the defective pixel before the imaging device obtains the radiographic image; and a defect correction unit configured to correct a defect of the radiographic image based on the defective pixel of the defect map.

15. An image processing apparatus comprising:
an imaging device configured to obtain a radiographic image according to radiation; and
at least one processor operatively coupled to a memory device and programmed to provide:
a selection unit configured to select characteristic information from a plurality of characteristic information corresponding to time at which a dark image is to be obtained after the imaging device is ready for imaging, based on a time at which a dark image is obtained after the imaging device is ready for imaging, wherein each of the plurality of characteristic information indicates a relationship between time and an output fluctuation amount of each pixel caused by an accumulation state of an electric charge by a dark current in the imaging device,
a defect information obtaining unit configured to obtain, based on the selected characteristic information indicating a defective pixel in which the output fluctuation amount under an unexposed state exceeds a predetermined threshold,
and a defect information storage unit configured to store a defect map that includes the defective pixel in which the output fluctuation amount under an unexposed state exceeds said predetermined threshold before the imaging device obtains the radiographic image.

16. An image processing method of an image processing apparatus having an imaging device configured to obtain a radiographic image according to radiation, comprising using a processor to perform steps of:
selecting characteristic information from a plurality of characteristic information corresponding to time at which the dark image is to be obtained after the imaging device is ready for imaging, based on a time at which a dark image is obtained after the imaging device is ready for imaging, wherein each of the plurality of characteristic information indicates a relationship between time and an output fluctuation amount of each pixel caused by an accumulation state of an electric charge by a dark current in the imaging device;
obtaining, based on the selected characteristic information, information indicating a defective pixel in which the output fluctuation amount under an unexposed state exceeds a predetermined threshold;
storing a defect map that includes the defective pixel in which the output fluctuation amount under an unexposed state exceeds said predetermined threshold before the imaging device obtains the radiographic image; and
correcting a defect of the radiographic image based on the information indicating the defective pixel of the defect map.

17. A non-transitory computer readable storage medium storing a computer program for causing a computer to perform the image processing method according to claim 16.

* * * * *